United States Patent [19]
Burrough

[11] 3,805,660
[45] Apr. 23, 1974

[54] SHEAR BAR FOR FORAGE HARVESTERS OR THE LIKE

[75] Inventor: Donald E. Burrough, West Bend, Wis.

[73] Assignee: Gehl Company, West Bend, Wis.

[22] Filed: Jan. 15, 1973

[21] Appl. No.: 323,981

[52] U.S. Cl..................... 83/658, 83/356.3, 83/674, 241/197, 241/300, 56/250
[51] Int. Cl............................................. A01d 55/18
[58] Field of Search ............ 83/658, 673, 674, 677, 83/694, 356.3, 856, 349; 241/222, 186 R, 197, 300, 282.1; 56/250

[56] References Cited
UNITED STATES PATENTS
3,635,271   1/1972   Markham........................... 241/222
3,321,145   5/1967   Gorman........................... 83/349 X Primary Examiner—Willie G. Abercrombie
Attorney, Agent, or Firm—James E. Nilles

[57] ABSTRACT

A shear bar for a forage harvester and which cooperates with the rotary chopping cylinder of the harvester to cut the crop into small particles. The shear bar has hard facing along the vertical side adjacent the shearing corner and furthermore has hard facing on the horizontal side adjacent said shearing corner, but the horizontal hard facing is located a slight distance away from the shearing corner and from the vertical surface. A space between the hard facing and the vertical facing is thus permitted to erode or wear away during use and thereby automatically forms a very sharp cutting edge which cooperates with the rotating knives of the chopping cylinder.

7 Claims, 5 Drawing Figures

SHEAR BAR FOR FORAGE HARVESTERS OR THE LIKE

BACKGROUND OF THE INVENTION

The invention pertains generally to forage harvesters and more particularly to the shear bar rigidly mounted on the harvester and with which the rotatably driven chopping cylinder cooperates to thereby cut the crop into small particles.

In the past, it has been difficult and time consuming to maintain the shear bar in proper condition so as to effectively cooperate with the rotating knives of the chopping cylinder. Such a shear bar is subjected to sever abrasion and wear and must rather frequently be removed for sharpening or replacement.

One attempt to overcome the problems of such a shear bar is shown and described in the U.S. Pat. No. 3,635,271 issued Jan. 18, 1972 to Markham and entitled "Cutter Head and Shear Bar for Forage Harvesters." In that patent it proposed to use a shear bar having hard facing on the vertical surface only of the bar. Such a device worked reasonably well, but due to the uncontrolled erosion of the shear bar behind its vertical hard facing, the vertical hard facing portion of the shear bar rather quickly became unsupported due to the fact that its supporting portion of the shear bar was rather rapidly eroded away. Consequently, the vertical hard facing of the shear bar itself deteriorated rapidly.

SUMMARY OF THE INVENTION

The present invention provides an improved shear bar for a forage harvester, which shear bar has a vertical hard facing, for example of tungsten carbide, and in which the erosion and wear on the horizontal surface of the shear bar adjacent the shear corner is controlled. This control is provided by applying hard facing to the horizontal surface of the shear bar also but at a distance spaced slightly away from the vertical hard facing. This spacing leaves an unprotected portion along the edge of the shear bar and immediately behind the hard facing, and as wear occurs in this controlled area, a sharpened edge is presented to the cooperating, rotating cylinder knives. By controlling the amount of wear behind the vertical hard facing, the shear bar is not as rapidly eroded away immediately behind the vertical hard facing and thereby the latter is properly supported by the shear bar.

These and other objects and advantages of the present invention will appear hereinafter as this disclosure progresses, reference being had to the accompanying drawings.

DESCRIPTION OF A PREFERRED EMBODIMENT

Figure 1:
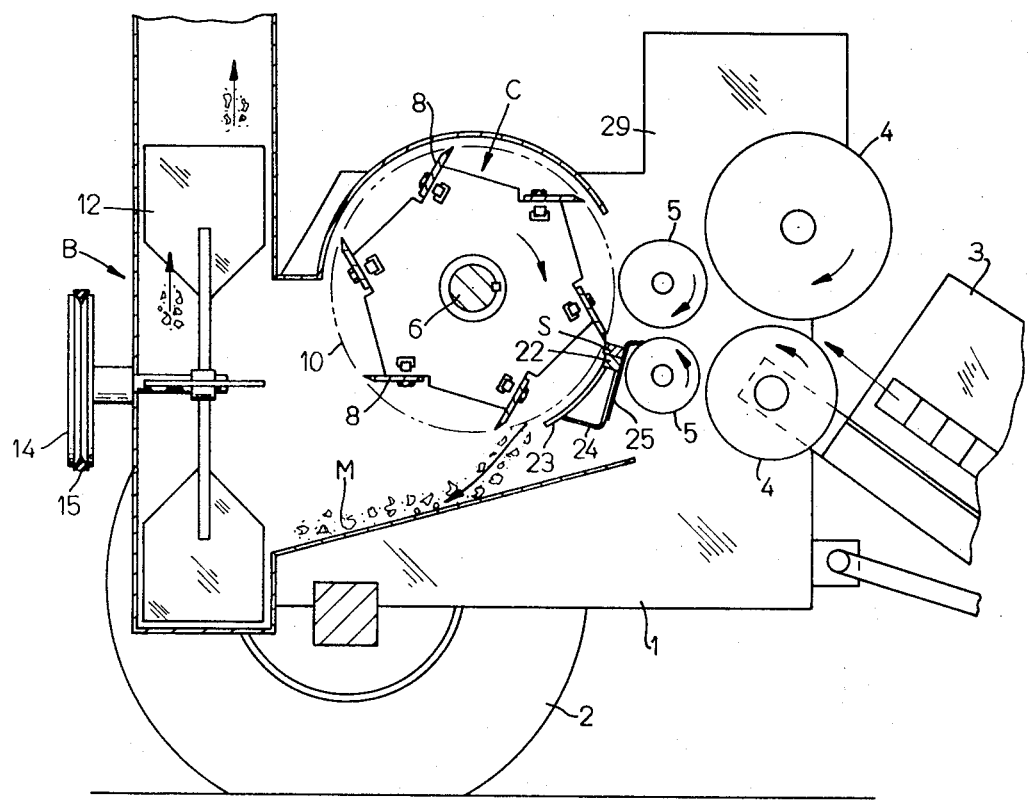
FIG. 1 is a longitudinal, vertical, cross sectional view through a forage harvester embodying the present invention, certain portions being shown as broken away or removed shown schematically for clarity in the drawings.
Figure 2:
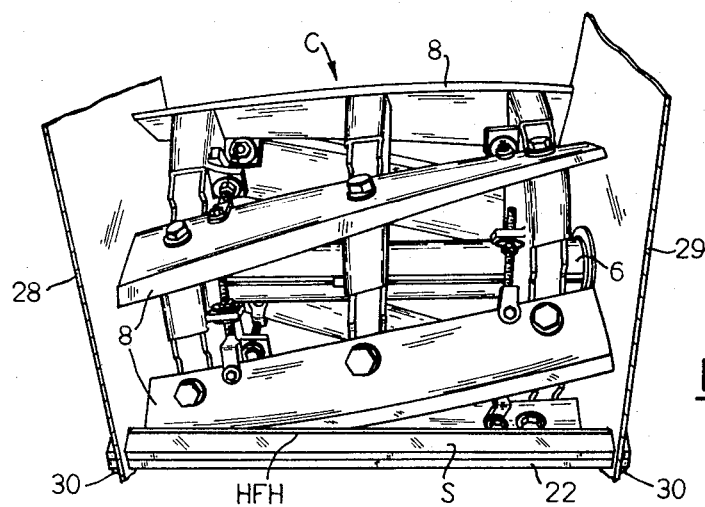
FIG. 2 is a perspective view taken generally from the front of the chopping cylinder and showing the shear bar in respect thereto.

Referring to FIG. 1, the forage harvester with which the present invention is used is of the conventional type and includes a main frame 1 having ground supporting wheels 2 (only one shown) at opposite sides, a crop receiving portion 3 which delivers the crop in the known manner to the pairs of feed rolls 4 and 5. A rotatable chopping cylinder C is journalled on its shaft 6 within the main frame of the machine and the cylinder includes a series of circumferentially spaced, conventional knives 8 which, when the cylinder is rotating define an imaginary cylindrical surface 10. A blower B including a rotatable multi-paddle fan 12 is located at the rear of the harvester and acts to receive the material M which is cut by the cylinder and thrown rearwardly into the blower. The paddles are rotated by the pulley 14 which is driven by an endless belt 15 from a power source (not shown) all in the conventional manner.

The shear bar S provided by the present invention is generally of rectangular cross sectional shape and has a shear corner 20 which cooperates with the knives 8 of the rotating cylinder in the known manner to cut the crop material as it is delivered to the cylinder by the feed rolls. The shear bar has a supporting or back-up bar 22 on which the shear bar rests. The bars are supported on the transversely extending steel members 23, 24 and 25 which are fabricated together to form a rigid unit that is rigidly mounted in the main frame of the machine.

Figure 3:
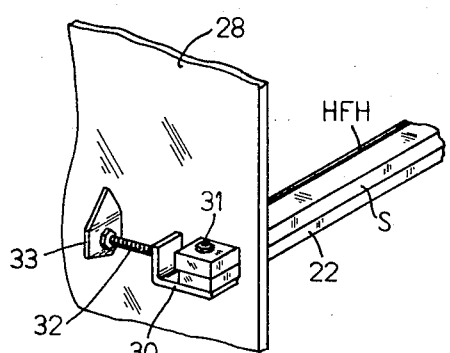
FIG. 3 is a fragmentary, enlarged, perspective view of one end of the shear bar and its mounting means.

As shown in FIG. 3, the ends of the shear bar and its support bar 22 are adjustably mounted in the side walls 28, 29 of the machine by means of the bracket 30 on which the bars are rigidly secured by the bolt means 31. The bracket 30 is in turn rigidly secured to the bolt 32 which extends through a bracket 33 in the side walls and can be threadably adjusted in a generally fore and aft direction in respect to harvester movement so as to accurately position the shearing corner of the shear bar in respect to the imaginary cylinder 10 generated by the rotating knives 8.

Figure 4:
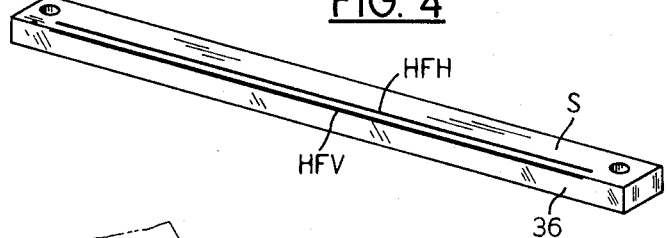
FIG. 4 is a perspective view of a shear bar made in accordance with the present invention.
Figure 5:
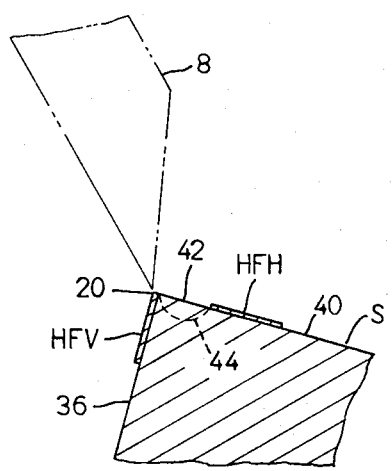
FIG. 5 is a fragmentary, enlarged, cross sectional view through a portion of the shear bar made in accordance with the present invention.

The shear bar S includes a generally vertical side 36 (FIGS. 4 and 5) and the upper portion of the vertical surface has hard facing HFV affixed thereon and for a distance which extends from the top of the bar downwardly a distance along the vertical surface as shown more clearly in FIG. 5. This hard facing is preferably of tungsten carbide which has a chemical analysis of tungsten carbide, iron, nickel, chromium, silicone, carbon and boron. The tungsten carbide is preferably about 35 percent of the total, the nickel 46 percent of the total, the chromium is about 11 per cent of the total, and the iron, silicone and boron all constitute about 2.5 percent of the total. The carbon may constitute about 0.5 percent of the total. This hard facing material may be sprayed on the surfaces as required. It will be noted that the hard facing only extends for the working length of the bar.

As also shown clearly in FIG. 5, it will be noted that the generally horizontal surface 40 of the shear bar S also has hard facing material HFH affixed thereon and such material is located a distance from the shearing corner 20 of the bar and extends along the generally horizontal portion 40 of the bar for a distance. Thus, a portion 42 of the horizontal surface of the shear bar is unprotected, that is to say, the horizontal surface of the shear bar from the hard facing material HFV on the vertical surface and the hard facing material HFH on the horizontal surface. An unprotected distance of about 3/16 inches has been found to be particularly desirable in controlling the wear and abrasion of the upper surface of the shear bar adjacent the working corner. The hard facing material HFH on the generally horizontal surface of the shear bar acts to prevent wear on the upper surface adjacent the upper portion 42. This acts to control or prevent undue erosion of the upper surface of the shear bar in the area 42. As shown in FIG. 5, the actual amount of erosion is held or controlled to that indicated by the dotted line 44, for a considerable period of time. This prevents the erosion of the shear bar immediately adjacent the hard facing HFV on the vertical face and thereby prevents the vertical hard facing from collapsing or breaking away as it would do if it were not adequately supported.

By means of the present invention, a shear bar is provided in which the erosion of the shear bar acts to automatically create and maintain a sharpened edge for cooperation with the rotating cylinder knives. The vertical hard facing on the shear bar is thereby adequately and firmly supported and its life is greatly extended.

I claim:

1. A shear bar for cooperating with rotating knives of a cylindrical cutter, said shear bar having a shearing corner adjacent said rotating cutter, said corner being defined by a generally vertical surface of the shear bar and a generally horizontal surface of the shear bar, hard facing material extending from said corner and downwardly a distance along said vertical surface, and hard facing material also located on said horizontal surface and spaced a distance from said corner so as to define an unprotected area on said generally horizontal surface of said shear bar immediately adjacent the hard facing material on said vertical surface.

2. The shear bar set forth in claim 1 further characterized in that said hard facing material is of a chemical analysis consisting of about 35 percent tungsten carbide, about 46 percent nickel and about 11 percent chromium, and also including iron, carbon, silicone and boron.

3. The shear bar set forth in claim 1 further characterized in that said spaced distance is approximately 3/16 of an inch.

4. The shear bar set forth in claim 2 further characterized in that said spaced distance is approximately 3/16 of an inch.

5. The shear bar defined in claim 1 including hole means at each end of said bar for attachment to a support means.

6. The shear bar defined in claim 3 including hole means at each end of said bar for attachment to a support means.

7. The shear bar defined in claim 4 including hole means at each end of said bar for attachment to a support means.

* * * * *